Nov. 20, 1962  W. B. PIERCE  3,064,471
FLIGHT SIMULATOR AND TEST FACILITY
Filed May 15, 1959  3 Sheets-Sheet 2
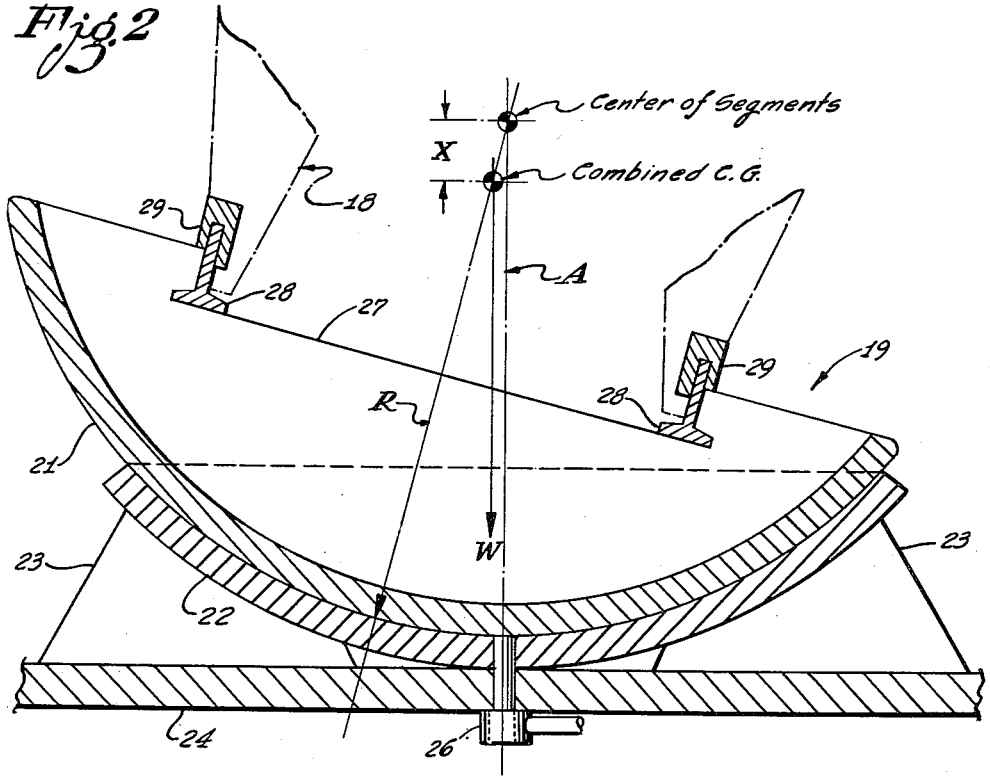
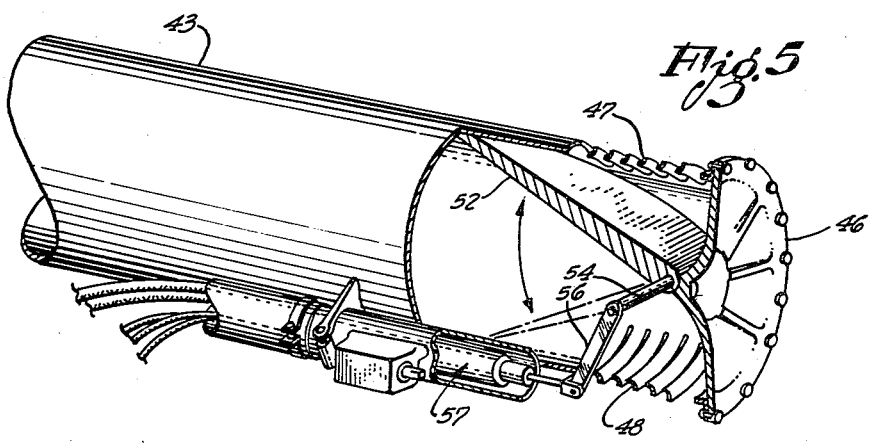
INVENTOR:
Wallace B. Pierce
Agent, Nov. 20, 1962 W. B. PIERCE 3,064,471
FLIGHT SIMULATOR AND TEST FACILITY
Filed May 15, 1959 3 Sheets-Sheet 3
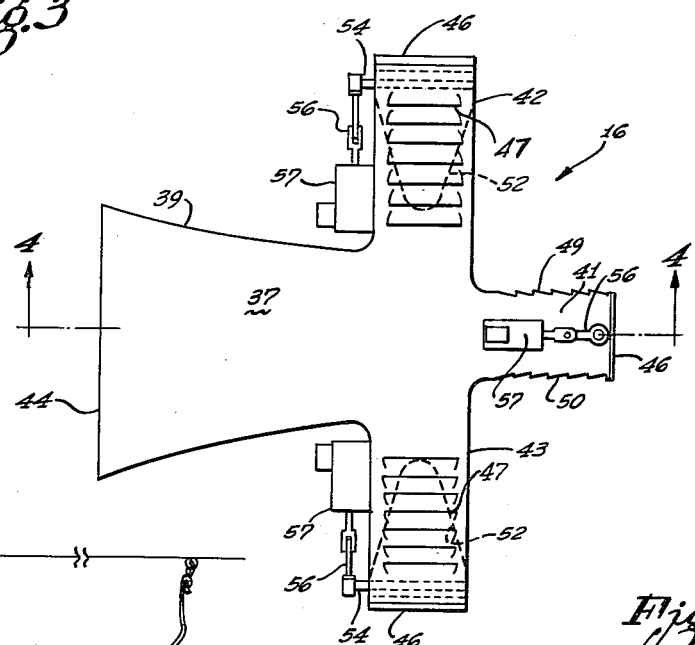
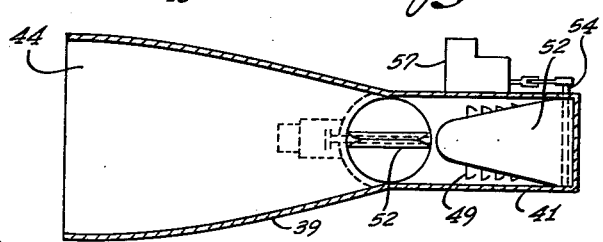
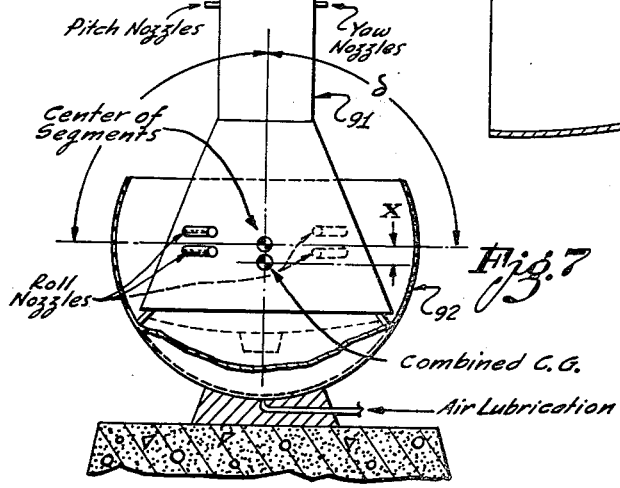
INVENTOR:
Wallace B. Pierce United States Patent Office 3,064,471
Patented Nov. 20, 1962

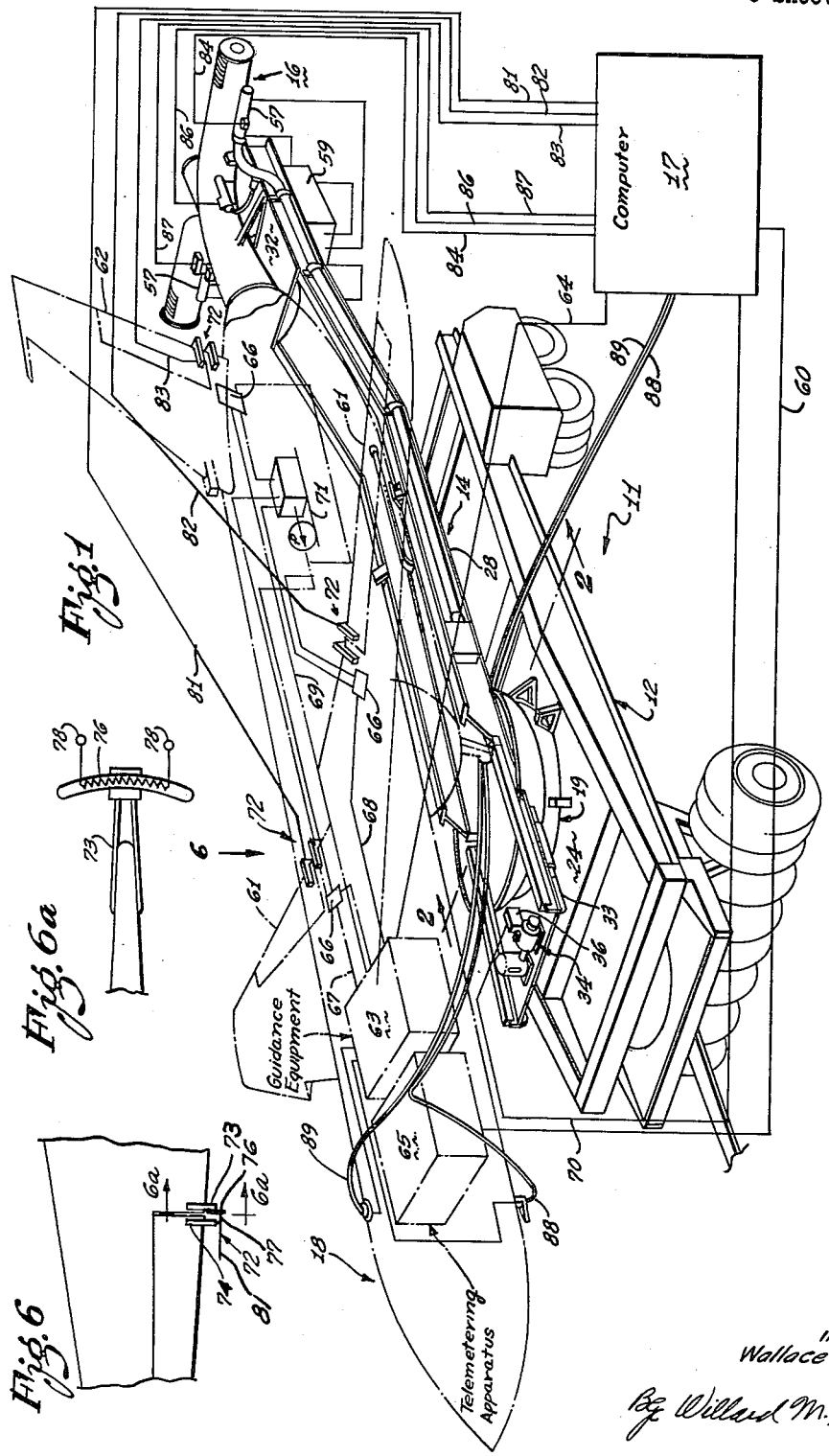

3,064,471
FLIGHT SIMULATOR AND TEST FACILITY
Wallace B. Pierce, Burbank, Calif., assignor to Northrop Corporation, Beverly Hills, Calif., a corporation of California
Filed May 15, 1959, Ser. No. 813,503
5 Claims. (Cl. 73—116)

This invention relates to test facilities and more particularly to a test facility and flight simulator for jet type aircraft and the like and is characterized in that it provides means whereby the guidance, control and telemetering systems of an aircraft may be checked for operating efficiency in their assembled and operating relation in the aircraft.

Automatic guidance and control systems utilized in present-day aircraft, missiles, etc., are extremely complex. Because of the complexity and size of these systems it is necessary to test and check the various components thereof individually prior to mounting them in their assembled relation in an aircraft or missile. Although the individual checks may indicate that the various components comprising a system are operating efficiently they quite frequently malfunction when positioned in their assembled relation in an aircraft or missile.

Accordingly an object of the present invention is to provide a test facility which enables the guidance, control and telemetering systems of an aircraft or the like to be checked for operating efficiency in their assembled relation in an aircraft or missile.

Another object is to provide a test facility on which aircraft or missiles may be mounted for pivotal movement about their roll, pitch and yaw axis.

Another object is to provide a test facility on which an aircraft or missile may be mounted and which will cause the aircraft or missile to assume a predetermined and stable position at such times that forces, other than gravitational forces, are not acting thereon.

Although the characteristic features of the present invention are particularly pointed out in the appended claims, the invention itself, also the manner in which it may be carried out, will be better understood by referring to the following description taken in connection with the accompanying drawings forming a part of this application and in which:

FIGURE 1 is a perspective view of the test facility as disclosed herein having an aircraft mounted thereon, the latter being shown in phantom construction.

FIGURE 2 is a fragmentary sectional view of the test facility as viewed along the line 2—2 of FIGURE 1.

FIGURE 3 is a plan view of the blast deflector utilized in the test facility of FIGURE 1.

FIGURE 4 is a sectional view of the blast deflector of FIGURE 3 as indicated by the line 4—4 in the latter figure.

FIGURE 5 is a perspective view of the left arm portion of the blast deflector of FIGURE 3, parts thereof being broken away to better show its internal construction.

FIGURE 6 is a view of one type of "pick off" means for measuring control surface deflection as indicated by the arrow 6 in FIGURE 1.

FIGURE 6a is a view of the "pick-off" means of FIGURE 6 taken as indicated by the line 6a—6a in the latter figure.

FIGURE 7 is an elevational view of another embodiment of the test facility as disclosed herein with parts thereof broken away for purposes of clarity.

Referring now to the drawings, two embodiments of the test facility and flight simulator as disclosed herein are shown in FIGURES 1 and 7. The test facilities shown in these figures are similar, however, FIGURE 1 shows a mobile installation while a permanent or stationary installation is shown in FIGURE 7. Also, an air breathing missile 18 is shown in its mounted position on the facility in FIGURE 1 while a reentry capsule 91 of a ballistic type missile is shown in FIGURE 7.

The embodiment of the test facility and flight simulator shown in FIGURE 1 will be described in detail, however, it will be understood that the following description will also apply in a general sense to the installation shown in FIGURE 7 and other similar installations.

The test facility and flight simulator as shown in FIGURE 1 is identified in its entirety by the numeral 11 and includes a transportation trailer 12, a boom structure 14, a blast deflector 16 and an electronic computer 17. Also shown in phantom construction is a jet-type air breathing missile 18 which is mounted on the boom structure 14. The missile 18 is provided with elevon and rudder control surfaces 61 and 62, respectively, and is equipped with guidance, control and telemetering equipment to be further described as the disclosure progresses.

The trailer 12 is of conventional construction and merely provides a mobile support for the boom structure 14. In this respect the trailer 12 may be replaced by a stationary type structure such as that shown in FIGURE 7 if mobility is not required. The boom structure 14 is mounted on the upper portion of a ball-and-socket type bearing assembly 19 portions of which are fixedly secured to the trailer 12 substantially as shown in FIGURES 1 and 2.

The bearing assembly 19 includes upper and lower shell-like spherical segments 21 and 22, respectively, as best seen in FIGURE 2. The lower segment 22 is fixedly mounted on plate 24 which constitutes an integral component of the trailer 12. As mounted the axis "A" of the segment 22 extends vertically at such times as the trailer 12 is resting on a horizontal surface. Suitable braces 23 maintain a fixed relationship between the shell 22 and the plate 24 and therefore a fixed relation between the shell 22 and trailer 12. The segment 21 is nested in the segment 22 with the outer surface of the segment 21 contacting and mating with the inner surface of the segment 22.

Extending through the lower segment 22 and also through the plate 24 is a fitting 26 through which air or other lubricants are directed to the mating or contacting surfaces of the segments 21 and 22. Although only one fitting 26 is shown in FIGURE 2 a plurality of such fittings (not shown) may be provided if desired. Air or other lubricants admitted through the fitting 26 escapes between the mating surfaces of the segments 21 and 22 and functions to lubricate and minimize friction between these two surfaces.

The upper edges of the segment 21 are notched at diametrical opposite locations as indicated by the numeral 27 in FIGURE 2. Slidably mounted in opposed relation in the notches 27 is a pair of side members 28—28 which constitute components of the boom structure 14 and in the present embodiment are I-beams. The members 28—28 are of sufficient length to receive the aforementioned missile 18 or other typical aircraft. The upper flange and a portion of the web of the members 28—28 are removed at their forward ends. The removed portions of the members 28—28 are replaced by rails 29—29 on which the missile 18 is slidably mounted. The missile is also supported on a third rail (not shown) which constitutes a component of and is fixedly secured to the boom structure 14 at a location aft of the bearing assembly 19 and midway between the members 28—28; thus a three-point suspension is provided for the missile 18. The radii of the contacting surfaces of the segments 21 and 22 are determined by the location of the combined center of gravity of the missile 18 and boom structure 14 in a manner presently explained.

The boom structure 14 includes the aforementioned pair of side members 28—28 which are held in rigid, spaced and parallel relation by fore and aft plates 24 and 32, respectively. Attached to the upper segment 21 and the side members 28—28 is a pair of hydraulic actuators 33—33 (only one of which is shown in FIGURE 1) for moving the side members 28—28, and other components attached thereto in a longitudinal direction with respect to the trailer 12. A hydraulic pump and reservoir combination 34, mounted on and movable with the boom structure 14 supplies pressurized fluid to the actuators 33—33.

The blast deflector 16 is fixedly secured to the aft plate 32 at a position to receive the exhaust blast of the missile 18. With the missile 18 mounted on the boom structure 14, as shown in FIGURE 1, it will be apparent that the boom structure, blast deflector 16 and missile 18 may be moved in fore and aft directions with respect to the trailer 12 by means of the actuators 33. Thus it will be seen that the combined center of gravity of the boom structure and missile may be moved into vertical alignment with the axis of the segment 22. The respective radii of the mating surfaces of the segments 21 and 22 are slightly greater than the distance from the mating surfaces to the aforementioned combined center of gravity by a predetermined distance as indicated by the distance "X" in FIGURE 2.

Thus, after the above adjustments have been effected, it will be seen that the missile and boom structure will have a stable relation on the bearing 19. In other words, as forces are applied to impart roll, pitch and yaw movements to the missile 18, and such forces are subsequently removed, gravity will act to return the missile to a normal or predetermined attitude in which the segment 21 is centrally positioned with respect to the segment 22. Unrestricted pivotal movement of the segment 21 with respect to the segment 22 due to pitch, roll and yaw movements imparted to the missile 18 by the blast deflector 16 are frequently referred to as "three freedoms of movement."

A gyroscope 36 or other type of pick-up device is mounted on and moves with the boom structure 14 and functions to provide signals corresponding to the attitude of the boom structure 14 and missile 18. These signals, in the absence of telemetering signals provided by equipment in the missile 18, are transmitted to the computer 17 for a purpose to be explained presently.

The blast deflector 16 is characterized in that it includes a hollow body structure 37 generally of "Latin-Cross" configuration when viewed in plan as shown in FIGURE 3. The structure 37 includes a forward inlet portion 39, an aft portion 41 and a pair of side arms 42 and 43. In the embodiment shown most portions of the structure are annular in cross-section with their axes located in a common plane. The portion 39 is of conical configuration, the walls thereof diverging as they recede from the arm portions 42 and 43 as best seen in FIGURES 3 and 4. This construction imparts a shape to the portion 39 having the proper transition for the efficient flow of gases therethrough from the opening 44 to the juncture of the portion 39 with the arms 42 and 43. The other portions of the structure 37 are circular in cross-section throughout their length.

The ends of the aft and arm portions 41, 42 and 43 are closed by plates 46. Exhaust ports 47 and 48 are formed in the upper and lower walls of the arms 42 and 43, respectively, at diametrically opposite positions and at locations adjacent the outer end of each portion as best seen in FIGURE 5. Diametrically opposed exhaust ports 49 and 50 are also provided in the side walls of the aft portion 41. Plate-type deflector valves 52, which function to deflect and direct exhaust gases through the ports 47–50, inclusive, according to the setting of the respective valves, are mounted for pivotal movement in each of the portions 41, 42 and 43. The valves 52 are mounted on respective shafts 54 and each carries a crank arm 56 at one end thereof.

Mounted externally of the structure 37, on each of the portions 41, 42 and 43, is a respective electro-hydraulic actuator assembly 57 of a type shown and disclosed in U.S. Patent 2,767,689. The output member of the assemblies 57 are connected to the cranks 56 and function to position the valves 52 in response to signals received by the assemblies 57 in a conventional manner. Pressurized fluid for the hydraulic actuators of the assemblies 57 is provided by a pump-reservoir combination 59 which is mounted on the plate 32.

The deflector plates 52 have a neutral or centered position in which the plates mounted in the portions 42 and 43 coincide generally with the aforementioned common plane containing the axes of these portions. The deflector plate 52 mounted in the aft portion 41 coincides with a vertical plane containing the axis of the latter portion. Under these conditions and with the deflector 16 secured to the plate 32, substantially as shown in FIGURE 1, it will be apparent that the exhaust blast from the missile's engine as it exhausts through the deflector 16, will not effect the attitude of the missile 18 and boom structure 14. This is due to the fact that equal amounts of exhaust gas are directed through the ports 47 and 48 and also equal amounts are exhausted through the ports 49 and 50. Thus it will be apparent that reaction forces of the exhaust blast which will under certain conditions impart roll, pitch and yaw movements to the missile 18 and boom structure 14, will be cancelled out and no movement will be imparted to the missile 18 and boom structure 14.

If, however, the deflector plates 52 are moved from their neutral or centered positions the reaction force of the exhaust blast escaping from the various ports 47–50, inclusive, will no longer neutralize each other, consequently roll, pitch or yaw movements or combinations thereof will be imparted to the missile and boom assembly in accordance with the instantaneous position of the deflectors in their respective portions of the deflector 16.

In actual flight the course of the missile 18 is controlled by the aforementioned pair of elevons 61 and rudder 62. Inasmuch as the missile 18 is pilotless it includes a guidance system 63 which may embody a radio receiver, play-back or like equipment according to the type of guidance procedure utilized to direct the flight of the missile. In the embodiment shown flight signals may originate in the guidance system 63 (via play-back equipment) or they may be placed in the computer 17 and transmitted to the guidance equipment 63 through a cable 64.

System signals $e_s$ are transmitted from the guidance system 63 to electro-hydraulic actuators 66, positioned adjacent the elevons 61—61 and rudder 62, through connectors 67, 68 and 69, respectively. The actuators 66 function to position the control surfaces 61—61 and 62 in accordance with the signals $e_s$. Pressurized fluid for the actuators 66 is provided by the pump-reservoir assembly 71.

Pick-off means 72, similar in construction to those shown and described in U.S. Patent No. 2,887,680, insofar as the clamping portion thereof is concerned, are frictionally mounted on the missile adjacent the inboard ends of the elevons 61—61 and an end of the rudder 62. The pick-off means 72 may be of various types, however, the type shown in FIGURE 6 constitutes potentiometer assemblies each including a pair of jaw-like clamp members 73 and 74. Each of the members 73, which are attached to non-movable structure of the missile 18, carries a resistor element 76 while each of the members 74, which are respectively attached to and move with the elevons 61—61 or the rudder 62, carries a wiper member 77. The poles 78—78 of the resistor element 76 are connected in a conventional manner to a D.C. power source (not shown). As mounted on the missile 18 the wiper member 77 bears on the resistor element 76 and functions to originate electrical signals corresponding to the displacement of the elevons or rudder from their respective neutral positions. The potentiometer assemblies 72, being held on the missile 18 by frictional means, may be easily and quickly removed from the missile in response to a rearward force or pull.

Signals or current flow from the potentiometer assemblies 72 are transmitted to the computer 17 via connectors 81, 82 and 83. These signals are amplified in the computer 17, modified in accordance with flight conditions previously stored in the computer 17 and also in accordance with signals received from the telemetering apparatus 65. The latter signals are representative of changes in attitude of the missile 18 and are transmitted to the computer 17 via connector 60. Alternately, in the event the aircraft being tested is not equipped with telemetering apparatus, the signals from the potentiometer assemblies 72 may be compared with signals received from the pick-up device 36 which are transmitted to the computer 17 via connector 70.

The aforementioned modified signals are then transmitted to the electro-hydraulic actuators 57 mounted on the blast deflector 16. In other words signals from the assemblies 72, located adjacent the right and left elevons 61, are first transmitted to the computer 17 and then to the electro-hydraulic actuators 57 located on the portions 42 and 43, respectively, while signals from the assembly 72, located adjacent the rudder 62, are first transmitted to the computer 17 and then to the actuator 57 located on the aft portion 41 of the blast deflector. These modified signals are carried by the connectors 84, 86 and 87.

Accordingly, as the rudder 62 is moved to the right or left from its neutral position, the exhaust blast from the missile's engine will be ported in varying degrees to the right or left, respectively, according to the position of the valve 52 in the portion 41 and the missile 18 and boom structure 14 will be yawed either to the right or left. A similar situation prevails in connection with the elevons 61. For example, if the right elevon (looking forward in aircraft) is raised and the left elevon lowered a greater amount of exhaust blast will be vented through the lower ports 48 in portion 43 than through the upper ports 47; the blast will be distributed in a reverse manner through the ports 47 and 48 in the portion 42. Accordingly, roll will be imparted to the missile and boom structure in a clockwise direction. The reverse action of the elevons 61 will result in roll being imparted to the missile in a counter-clockwise direction. Further, if corresponding movement is imparted to both elevons, that is they are each simultaneously raised or lowered equal amounts, pitching movements will be imparted to the missile and boom structure.

The computer 17 is of a conventional type which is well known to those experienced in the art. Simulated flight conditions such as velocity, acceleration, altitude, climatic conditions etc. may be stored in a computer of this type. The computer is adapted to receive signals originated by the potentiometer assemblies 72 amplify, alter and forward modified signals to the electro-hydraulic actuators 57. Further the computer is adapted to receive signals from the telemetering equipment 65, or alternately from the pick-up device 36, compare these signals with the simulated flight conditions stored in the computer, and forward modified or correction signals to the guidance system 63. In this respect pitot and static pressures, corresponding to actual flight conditions, are transmitted to the guidance system through fluid conduits 88 and 89. Positive and negative pressures for the pitot and static ports are provided by vacuum and pressure sources (not shown) which are located in and controlled by the computer 17.

The various components of the test facility having been described a clearer understanding thereof will be forthcoming from the following description of the facilities' operation.

*Operation*

For purposes of illustration it may be assumed that the missile 18 is to travel a predetermined flight course under selected flight conditions. Conditions which simulate the above flight course and flight conditions are stored in the computer 17 either manually or automatically.

Initial command signals $e_I$ necessary to cause the missile to travel the aforementioned flight course in actual flight and under the selected conditions are fed to the missile's guidance system 63 by the computer 17 via the cable 64. Alternately the initial command may originate with play-back euipment comprising a component of the guidance system 63. In turn the aforementioned control signals $e_s$ are fed by the guidance system to the electro-hydraulic actuators 66. Thus the control surfaces are moved and the throttle (not shown) of the jet engine is either advanced or retarded in accordance with the signals $e_s$, movement of the control surfaces results in movement of the wiper elements 77 on the resistor elements 76. Relative movement of the wiper elements with respect to the elements 76 results in changed current flow or signals to the computer 17. These signals are amplified and modified by equipment located in the computer 17 and in turn are transmitted to the actuators 57 via the connectors 84, 86 and 87 to position the deflector valves 52 in the deflector 16.

The missile 18 being pivotally mounted responds to forces created by the deflector 16 to impart roll, pitch or yaw movements thereto as the case may be substantially as though the missile was in actual flight. As the missile begins to assume its new attitude its movements are detected by the telemetering apparatus 65, alternately by pick-up device 36, and this information is continuously transmitted to the computer 17. As a result of information received from the telemetering apparatus the initial command signals $e_I$ are modified by the computer 17 and subsequently the signals $e_s$ are altered by the guidance system 63. Thus modified command and control signals $e_M$ and $e_m$, respectively, are forwarded to the guidance system 63 and actuators 57, respectively. This operation continues until, if all the components of the missile's guidance, telemetering and control system are functioning properly, the modified signals $e_M$ and $e_m$ become zero and for the time being no further signals are transmitted to the missile's guidance system or to the actuators 57.

The missile 18 now remains in its new attitude until a new phase of the flight course is reached or a new set of conditions are selected and placed in the computer 17. In either event if the missile responds in a predetermined manner positive proof is provided that the missile's guidance and control equipment is functioning properly in its assembled relation in the missile.

Referring to FIGURE 7, the guidance and control systems of the reentry capsule 91 may also be checked for operating efficiency by equipment as disclosed herein. In FIGURE 7 the reentry capsule is shown mounted in a vertical attitude in a bearing assembly 92 similar in construction to the bearing assembly 19 of FIGURE 2. In this embodiment it will also be noticed that the combined center of gravity of the reentry capsule and bearing assembly have the same relation with respect to the common bearing surfaces as in FIGURE 2. It will, therefore, be apparent that the mounting and structure of FIGURE 7 will provide the same advantages and display the same stability as the embodiment shown in FIGURE 2.

Thus a flight simulator and test facility for aircraft components of the class dsescribed is provided by means of which the objects of the invention may be carried out. For example, the instant facility provides means whereby guidance and control systems of an aircraft may be checked in their assembled and operating relation. Further, no extended disruption of the operation of the craft is required to dissemble and remove the various components of the craft's guidance and control system as presently required.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. A flight simulator and test facility comprising: a base structure; ball-and-socket type bearing means including a lower portion fixedly secured to said base structure and an upper portion mounted for free pivotal movement on said lower portion; said upper portion including means adapted to receive and secure a jet type aircraft thereon, said aircraft including control surfaces and means for actuating the same between centered and non-centered positions; a blast deflector having fore and aft ends and side portions; said aft end and side portions of said blast deflector having opposed sets of openings formed therein; said blast deflector being mounted on said upper portion at a position adapted to receive and deflect the blast from said aircraft and functioning to impart yaw, pitch and roll movements to said upper portion and aircraft at such times as the latter is mounted on said upper portion; sensing means adapted to sense movements of said control surfaces and originate signals corresponding to predetermined movements of said control surfaces from their centered positions; computer means functioning to receive the signals originated by said sensing means and forward modified signals corresponding to the instantaneous attitude of said aircraft; and electrical responsive valve means mounted on said blast deflector and being energized by said modified signals whereby predetermined amounts of said blast are caused to escape through each of said sets of openings.

2. A flight simulator and test facility the combination as set forth in claim 1: in which said sensing means constitutes electrical potentiometer means and said valve means includes electro-hydraulic actuators and plate-like valve elements.

3. A flight simulator and test facility comprising: a base structure; ball-and-socket type bearing means including a lower portion fixedly secured to said base structure and an upper portion mounted for pivotal movement on said lower portion; said upper portion including means adapted to receive and mount a jet type aircraft thereon for movement therewith, said aircraft having control surfaces and a control system for actuating said control surfaces between centered and non-centered positions and equipped with an automatic guidance system adapted to originate control signals and transmit them to said control system; a blast deflector having fore and aft ends and side portions; said aft end and side portions of said blast deflector having opposed sets of openings formed therein; said blast deflector being fixedly mounted on said upper portion at a position adapted to receive and deflect the blast from said aircraft and functioning to impart yaw, pitch and roll movements to said upper portion and aircraft at such times as the latter is mounted on said upper portion; sensing means adapted to sense movements of said control surfaces and originate signals corresponding to predetermined movements of said control surfaces from their centered positions; computer means functioning to receive the signals originated by said sensing means and forward modified signals corresponding to the instantaneous attitude of said aircraft; and electrical responsive valve means mounted on said blast deflector and being energized by said modified signals whereby predetermined amounts of said blast are caused to exist through each of said sets of openings.

4. A flight simulator and test facility the combination as set forth in claim 3: in which said sensing means constitutes electrical potentiometer means and said valve means includes electro-hydraulic actuators and plate-like valve elements.

5. In a flight simulator and test facility the combination comprising: a base structure; an air bearing assembly including a lower portion fixedly secured to said base structure and an upper portion mounted on said lower portion for universal pivotal movement thereon; said upper portion including means adapted to receive and mount a blast generator thereon for movement therewith; a blast deflector having fore and aft ends and side portions; said aft end and side portions of said blast deflector having opposed sets of openings formed therein; said blast deflector being fixedly mounted on said upper portion at a position adapted to receive and deflect the blast from said blast generator and functioning to impart yaw, pitch and roll movements to said upper portion and blast generator at such times as the latter is mounted on said upper portion; and valve means mounted on said blast deflector functioning when actuated to divert predetermined amounts of said blast through each of said sets of openings.

References Cited in the file of this patent

UNITED STATES PATENTS

| | | |
|---|---|---|
| 2,481,510 | Hollingsworth et al. | Sept. 13, 1949 |
| 2,654,552 | Jonas | Oct. 6, 1953 |
| 2,695,783 | Serafin | Nov. 30, 1954 |
| 2,700,888 | Good et al. | Feb. 1, 1955 |
| 2,726,510 | Goddard | Dec. 13, 1955 |
| 2,857,119 | Morguloff | Oct. 21, 1958 |
| 2,869,901 | Czwerwinski | Jan. 20, 1959 |
| 2,887,873 | Halpern et al. | May 26, 1959 |
| 2,909,764 | Chambers | Oct. 20, 1959 |
| 2,964,905 | Hewson et al. | Dec. 20, 1960 |